L. THOMAS & J. U. JEFFRIES.
SEMI-AUTOMATIC CHECK VALVE.
APPLICATION FILED AUG. 24, 1911.
1,031,300.
Patented July 2, 1912.
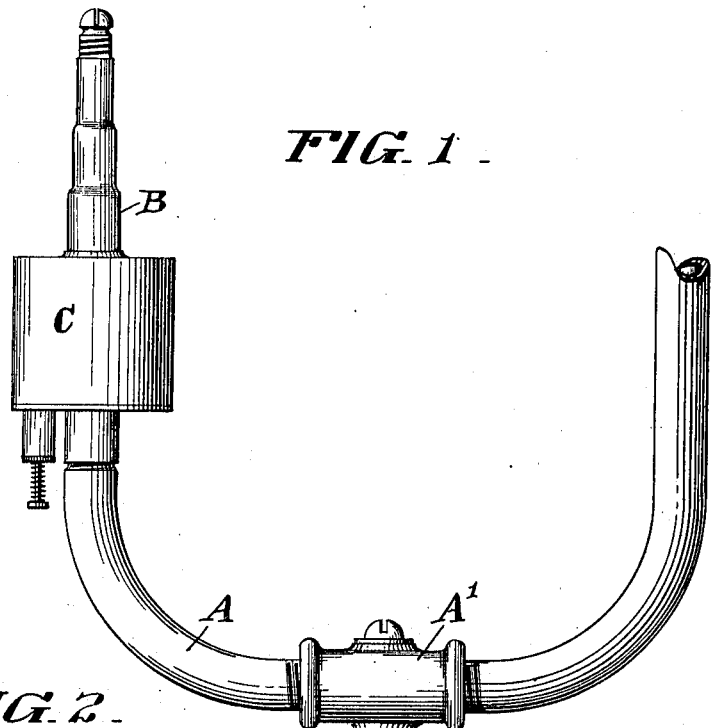
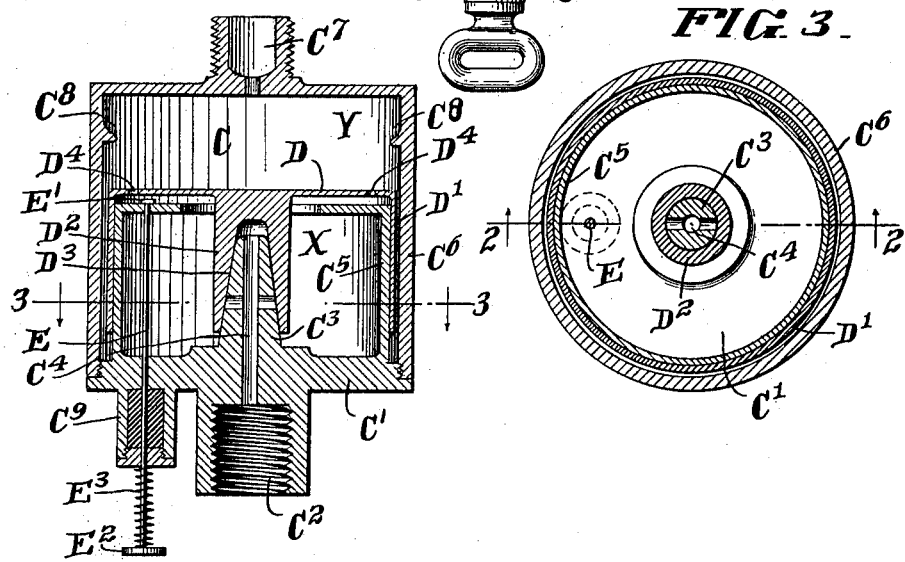

UNITED STATES PATENT OFFICE.

LEWIS THOMAS AND JOSEPH U. JEFFRIES, OF PHILADELPHIA, PENNSYLVANIA.

SEMI-AUTOMATIC CHECK-VALVE.

1,031,300. Specification of Letters Patent. Patented July 2, 1912.

Application filed August 24, 1911. Serial No. 645,776.

*To all whom it may concern:*

Be it known that we, LEWIS THOMAS and JOSEPH U. JEFFRIES, both citizens of the United States of America, residing in the city and county of Philadelphia and State of Pennsylvania, have invented a certain new and useful Improvement in Semi-Automatic Check-Valves, of which the following is a true and exact description, reference being had to the accompanying drawings, which form a part thereof.

The object of the present invention is to provide a simple, compact and effective valve adapted when open to be held open, fluid passing through the valve, so long as the normal flow conditions prevail and to close upon an interruption of such flow like an ordinary check valve, but which unlike the latter when closed remains closed until positively actuated by exterior means.

Our valve, while capable of a variety of uses, is particularly intended and adapted to be placed in a gas burner supply pipe to which gas is supplied through a prepayment meter. So installed, the valve when opened, remains open so long as the normal flow through the pipe in which it is placed continues, but when this flow is interrupted as by the prepayment meter shutting off the gas supply, the valve closes and remains closed until manually actuated, notwithstanding the fact that a coin or coins may have been inserted in the prepayment device in the meantime and the gas supply thereby restored. The use of the valve in the manner specified does away with a dangerous condition incident to the ordinary use of prepayment gas meters which has resulted in numerous fatalities and has restricted the use of such meters.

The various features of novelty which characterize our invention are pointed out with particularity in the claims annexed to and forming a part of this specification. For a better understanding of the invention, however, and the advantages possessed by it, reference should be had to the accompanying drawings and descriptive matter in which I have illustrated and described one form in which our invention may be embodied.

Of the drawings, Figure 1 is an elevation of a portion of a gas burner and its supply pipe with our improved valve interposed between the burner proper and the supply pipe. Fig. 2 is a sectional elevation of the valve, the section being taken on the line 2—2 of Fig. 3. Fig. 3 is a sectional plan, the section being taken on the line 3—3 of Fig. 2.

In the drawings, A, represents a portion of a gas light bracket of conventional form and provided with the usual cock A'. B represents the gas light burner body and C, our improved valve. As shown the valve comprises a disk-like body member C' formed centrally on its underside with a threaded socket $C^2$ receiving one end of the supply pipe A and formed at its upper sides with a conical boss $C^3$, the outer surface of which serves as a conical valve controlling the gas supply port $C^4$ leading from the socket $C^2$. Adjacent its periphery, the body C' is formed on its upper side with a cylindrical flange $C^5$. The member C' is threaded at its periphery to receive the threaded lower end of a member $C^6$ of inverted cup-shape. The latter is provided with a centrally disposed outlet port $C^7$ surrounded by a threaded boss on which the burner body B is screwed.

The port $C^4$ is controlled by a movable valve member D which as shown, serves also as a movable partition dividing the chamber in the casing formed by the parts C' and $C^6$ into inlet and outlet compartments X and Y, respectively. As shown, the member D is provided on its underside with a boss $D^2$ formed with a conical cavity $D^3$ receiving the boss $C^3$. When the partition member D is in its lowermost position, as shown in Fig. 2, the inner wall of the cavity $D^3$ seats against the conical valve seat formed by the outer surface of the boss $C^3$, thus closing the inlet port $C^4$. The inlet and outlet compartments X and Y are in restricted communication. Some leakage between these compartments may take place along the telescopic joint between the cylindrical flanges $C^5$ and D' and in addition restricted ports $D^4$ are shown as formed in the body of the member D. The parts are so proportioned that when the port $C^4$ is open and gas at the ordinary pressure is supplied to the inlet compartment X, the pressure in the outlet compartment Y will be slightly lower due to the throttling action of the passages connecting the two compartments. The pressure differential thus acting against the large area of the underside of the member exerts a lifting force on the member D exceeding the weight of the latter. The ports may be readily designed so that the pressure differential necessary to accomplish this need not exceed a quarter of an ounce per square inch or thereabout. Lugs C⁸ may be employed as shown to restrict the rising movement of the valve member D.

E, represents a sliding rod mounted in the member C' and provided at its upper end with a head E' adapted to engage the member D and lift it when the rod is lifted. The rod E is provided with an external operating button E² at its lower end.

C⁹ represents a stuffing box which may be employed to restrict leakage along the rod E, and E³ represents a spring tending to hold the rod in the position shown in Fig. 2. When the parts are in the position shown in Fig. 2, and the valve is seated, the maximum lifting force acting on the valve member D and tending to lift it and thereby open the port C⁴, is that due to the pressure of the gas in the supply pipe over an area which at the most does not exceed the cross sectional area of the boss C³ at its base, and the parts are readily so designed that this lifting force is appreciably less than the weight of the member D, so that there is no necessity for making the valve proper a balanced valve, which we consider slightly less desirable in most cases than the unbalanced conical valve shown. In consequence, the valve when closed is not automatically opened by the normal gas pressure in the supply pipe. When the valve is manually opened as it may be by a simple upward push on the rod E, and gas flows through the valve the pressure differential created, as explained above, exerts a lifting force on the member D which holds the valve open just as any ordinary check valve is held open by the flow through the conduit in which it is placed. On any interruption of this flow, produced for instance, by the operation of the prepayment device in shutting off the supply of gas, the valve member D drops to its lowermost position and closes the port C⁴, and this port will not be opened again until the valve is again manually actuated. We consider it advantageous to provide a conical valve and valve seat, as shown, since with this arrangement there is a tendency for the valve when closed to stick. This sticking tendency furnishes an additional element of safety in installations where for any reason there is a possibility of the pressure in the supply pipe rising occasionally appreciably above the normal pressure. This arrangement of the valve and its seat reduces the possibility of dirt particles collecting at points where they would interfere with the proper operation of the valve. It is to be noted also that if for any reason the valve does not properly seat and some leakage takes place between the valve and its seat this leakage unless very large will not cause the valve to open since it will not result in building up the necessary pressure differential.

With our valve installed as described, it will be apparent that the valve will close not only when the supply of gas to the pipe A is cut off, but also whenever the gas light is extinguished by the closure of the cock A'. This insures that our valve is opened and closed whenever the gas is turned on and off and thereby not only practically does away with all liability of the valve clogging up and sticking in the open position, but automatically causes attention to be directed to the valve when it is out of order and requires attention.

The valve construction shown is of especial value for the particular use as a part of a gas light fixture, for which it was primarily devised. Its compactness and shape make it unobjectionable in appearance, and its simplicity makes it possible for unskilled persons to operate it and keep it in order. The simplicity of the valve also permits of of its manufacture at a relatively low cost.

It will be observed that the movable valve is loaded, that is, given its tendency to close and when closed to remain closed, simply by the weight and disposition of the movable valve part, and without the use of any loading spring. The avoidance of the latter, while not an essential characteristic of our invention in its broader aspects, contributes to the desirable simplicity and reliability of the device.

While in accordance with the provisions of the statutes we have illustrated and described the best form of our invention now known to us, it will be apparent to those skilled in the art that changes may be made in the particular form of apparatus disclosed without departing from the spirit of our invention, and that sometimes it may be advantageous to use certain features of the invention without a corresponding use of other features.

Having now described our invention what we claim as new and desire to secure by Letters Patent, is,

1. In a device of the kind described the combination with a chambered valve casing having inlet and outlet ports opening to the chamber therein, and a valve seat at the margin of said inlet port of a loaded valve controlling said inlet port and tending to close when open, and when closed to remain closed under the pressure conditions then normally prevailing in said casing, the movement of said valve in the closing direction being directly limited by its engagement with said seat said valve being arranged to form a movable partition interposed between said ports and dividing said chamber into two compartments, provisions establishing communication between said compartments, restricted to create a difference between the pressures in the two compartments when said valve is open and the normal flow conditions prevail sufficient to hold the valve open, and means for opening said valve.

2. In a device of the kind described the combination with a chambered valve casing having inlet and outlet ports opening to the chamber therein and formed internally with a conical seat for a valve controlling said inlet port, of a loaded valve formed with a conical surface adapted to engage said seat and close said inlet port, and tending to close when open, and when closed to remain closed under the pressure conditions then normally prevailing in said casing, and being arranged to form a movable partition interposed between said ports and dividing said chamber into two compartments, provisions establishing communication between said compartments, restricted to create a difference in the pressures in the two compartments under the normal flow conditions prevailing when said valve is open, effective to hold the valve open, and means for opening said valve.

3. A device of the kind described comprising in combination a chambered casing with a lower inlet and an upper outlet port opening thereto and with a hollow conical boss on its inner side registering with and providing a continuation of said inlet port, a valve member comprising a vertically movable partition interposed between said ports and dividing said chamber into inlet and outlet compartments, and comprising also a portion formed with a conical cavity fitting over said boss and closing said inlet port when the valve member is in the closed position, the weight of said valve member exceeding the lifting force exerted on the valve member by the normal pressure in said inlet port when the valve is closed, provisions establishing a restricted communication between said compartments whereby a pressure differential between said compartments is created under normal flow conditions when the valve is open effective to hold the valve open, and an operating device for opening the valve projecting through said casing.

4. A device of the kind described comprising in combination a base member adapted to be attached to a gas supply pipe and formed on its upper side with a conical boss and an inlet port opening therethrough, and also formed on its upper side with a cylindrical flange surrounding said boss, a casing member detachably connected to said base member and formed with an outlet port and provisions for connecting a burner thereto, a valve member of inverted cup-like form telescoping with said cylindrical flange and formed with restricted ports leading through it and provided on its under side with a projection having a conical cavity receiving said boss and adapted to seat against the latter and close the inlet port when the valve member is in a lower position and an operating device projecting through said base member and movable to engage said valve member and lift the latter, said valve member being so proportioned that the valve when closed will remain closed regardless of the pressures then normally prevailing in said casing and when open the pressure differential acting on opposite sides of said valve is effective to hold the valve open.

LEWIS THOMAS.
JOSEPH U. JEFFRIES.

Witnesses:
ARNOLD KATZ,
J. R. BOUCOT.

Copies of this patent may be obtained for five cents each, by addressing the "Commissioner of Patents, Washington, D. C."